United States Patent [19]

Kado et al.

[11] Patent Number: 5,336,369
[45] Date of Patent: Aug. 9, 1994

[54] METHOD OF MAKING A CANTILEVER STYLUS FOR AN ATOMIC FORCE MICROSCOPE

[75] Inventors: Hiroyuki Kado, Katano; Takao Tohda, Ikoma, both of Japan

[73] Assignee: Matsushita Electric Industrial Co., Ltd., Osaka, Japan

[21] Appl. No.: 67,612

[22] Filed: May 27, 1993

Related U.S. Application Data

[62] Division of Ser. No. 699,951, May 14, 1991, Pat. No. 5,239,863.

[30] Foreign Application Priority Data

May 16, 1990 [JP] Japan ................. 2-127362

[51] Int. Cl.$^5$ .............. H05K 3/06; G01R 3/00; C23F 1/02; H01L 21/465
[52] U.S. Cl. ................. 156/659.1; 29/595; 156/634; 437/228
[58] Field of Search .............. 29/595; 73/105; 250/306, 307; 437/228, 245, 200; 156/633, 634, 659.1, 660, 661.1

[56] References Cited

U.S. PATENT DOCUMENTS

| 4,668,865 | 5/1987 | Gimzewski et al. | 250/306 |
| 4,916,002 | 4/1990 | Carver | 156/659.1 X |
| 4,943,719 | 7/1990 | Akamine et al. | 73/105 X |
| 5,021,364 | 6/1991 | Akamine et al. | 250/306 X |
| 5,051,379 | 9/1991 | Bayer et al. | 250/306 X |
| 5,066,358 | 11/1991 | Quate et al. | 156/659.1 X |

FOREIGN PATENT DOCUMENTS

| 0194323A1 | 3/1985 | European Pat. Off. |
| 0394962A2 | 4/1990 | European Pat. Off. |
| 54-134964 | 10/1979 | Japan |
| 63-55845 | 10/1988 | Japan |
| WO90/08397 | 7/1990 | PCT Int'l Appl. |

OTHER PUBLICATIONS

"Microfabrication of cantilever styli for the atomic force microscope", Albrecht et al., J. Vac. Sci. Technol. A8(4), Jul., Aug. 1990, pp. 3386–3396.
"Scanning tunneling microscopy", Hansma, J. Appl. Phys. 61(2), Jan. 15, 1987, pp. R1–R23.
"New scanning tunneling microscopy tip for measuring surface topography", Akama et al., J. Vac. Sci. Technol. A 8(1), Jan./Feb. 1990, pp. 429–433.

*Primary Examiner*—Thomas P. Noland
*Attorney, Agent, or Firm*—Wenderoth, Lind & Ponack

[57] ABSTRACT

A method of making a cantilever stylus for an atomic force microscope comprises forming a film on a surface of a substrate, the film comprising a stylus material that is different from the material of the substrate. A resist thin film of a material different from the stylus material is formed on the surface of the stylus material so as to have a tip. The stylus material is then etched with an isotropic etching technique to a depth of etching greater than the radius of curvature of the tip of the resist film so that the stylus material, having two opposite principal surfaces, has a tip formed on one of the principal surfaces with a radius of curvature less than 0.1 μm which protrudes beyond a tip of the other principal surface. At least the resist thin film and the substrate at the tips of the principal surfaces of the stylus material are then removed.

4 Claims, 4 Drawing Sheets

METHOD OF MAKING A CANTILEVER STYLUS FOR AN ATOMIC FORCE MICROSCOPE

This is a Rule 60 continuation of application Ser. No. 07/699,951 filed May 14, 1991 and now U.S. Pat. No. 5,239,863.

BACKGROUND OF THE INVENTION

1. Field of the Invention

The present invention relates generally to an atomic force microscope, and more particularly to a flat-cantilever stylus for use in the atomic force microscope and a method of making the stylus. A tip of one of two principal surfaces of the cantilever is used as the stylus.

2. Description of the Prior Art

Conventionally, a scanning tunneling microscope (hereinafter referred to as STM) has been developed as an instrument capable of observing the surface of a solid body on the order of atoms. However, since the STM detects a tunnel current between a sample and a stylus to observe the sample surface, it is impossible for the STM to observe the surface of an insulator. In order to solve this problem, an atomic force microscope (hereinafter referred to as AFM) for observing the sample surface by detecting forces acting between the sample and the stylus is proposed. Similar to the STM, the resolution of the AFM depends greatly upon the radius of curvature of the tip of the stylus. The smaller the radius of curvature is, the higher is the resolution is. In order to detect minute forces, the AFM requires a cantilever 25 having a stylus 26 formed on the tip thereof, as shown in FIG. 1. In some conventional AFMs, the tip of the cantilever is used as the stylus. A cantilever with an integrated pyramidal tip can be formed by using an etch pit as a mold. The stylus may be made by anisotropic etching. In recent years, styli having a radius of curvature of approximately 300 Å at the tip thereof have been obtained.

Although the AFM styli are made by various methods as described above, each method has problems. When the tip of the cantilever is utilized as the stylus, there are no problems in connection with adhesive properties between the cantilever and the stylus, and the manufacturing processes are comparatively simple. However, the radius of curvature is not less than several thousand angstroms in the ordinary photoetching technique because the radius of curvature of the tip fully depends upon the accuracy of photolithography. Therefore, a microscope manufactured by this method is low in resolution. A maskless etching technique such as FIB (Focused Ion Beam) is required to make the radius of curvature smaller than the aforementioned size, but the manufacturing processes are complicated and the problem of cost occurs. In a stylus made with an etch pit of crystal employed as a mold, although the radius of curvature can be reduced to a comparatively small value, the manufacturing processes are complicated. Furthermore, since the adhesive properties between the stylus and the cantilever are poor, observation in a vibration mode is difficult.

The manufacturing method utilizing anisotropic etching is susceptible to various parameters during etching and is poor in reproducing a stylus configuration.

SUMMARY OF THE INVENTION

The present invention has been developed to overcome the above-described disadvantages.

It is accordingly an object of the present invention to provide an improved cantilever stylus for use in an atomic force microscope, which stylus has a tip having an extremely small radius of curvature.

Another object of the present invention is to provide a method of making the above-described stylus.

In accomplishing these and other objects, the cantilever stylus according to the present invention comprises a cantilever having a fixed end and a free end and having two principal surfaces, and first and second tip portions formed in the respective principal surfaces of the free end. The first tip portion has a radius of curvature less than 0.1 $\mu$m and protrudes beyond the second tip portion so that the first tip portion may be used to observe the sample surface.

A method of making a cantilever stylus according another aspect of the present invention comprises the steps by forming on a surface of a substrate, a film consisting of a stylus material that is different from the a material of the substrate, forming, on a surface of the stylus material, a resist thin film consisting of a material different from the stylus material and having a tip, etching the stylus material by making use of an isotropic etching technique so that the depth of etching is greater than the radius of curvature of the tip of the resist thin film, forming the stylus material so that a tip of one principal surface thereof has a radius of curvature less than 0.1 $\mu$m and protrudes beyond a tip of the other principal surface thereof, and removing at least the resist thin film and the substrate adhering to the tips of the stylus material.

Since the tip of the resist thin film is formed by a conventional fine processing technique, the radius of curvature is greater than 0.1 $\mu$m. The thin film of the stylus material adjacent to the resist thin film is etched from both sides of the tip of the resist thin film using an isotropic etching technique. As a result, when the depth of etching is made greater than the radius of curvature of the tip of the resist thin film, at least the tip of one principal surface of the cantilever adhering to the resist thin film becomes very small in its radius of curvature. Further etching can make the radius of curvature of the tip of the other principal surface very small. Accordingly, the stylus having a radius of curvature less than 0.1 $\mu$m can be obtained by the conventional photoetching using the tip of one of the principal surfaces as the stylus, without using a fine processing technique on the order of submicrons, such as the FIB. This stylus can contribute to an atomic force microscope having a high resolution. In addition, since the tip of the cantilever is used as the stylus, the cantilever and the stylus are formed into a one-piece construction, thereby overcoming the problem of the adhesive properties between the stylus and the cantilever.

BRIEF DESCRIPTION OF THE DRAWINGS

The above and other objects and features of the present invention will become more apparent from the following description taken in conjunction with a preferred embodiment thereof with reference to the accompanying drawings, throughout which like parts are designated by like reference numerals, and wherein.

DETAILED DESCRIPTION OF THE PREFERRED EMBODIMENTS

Figure 1:
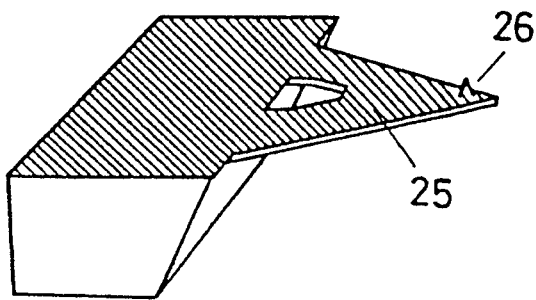
FIG. 1 is a perspective view of a conventional cantilever stylus for use in an atomic force microscope.
Figure 2:
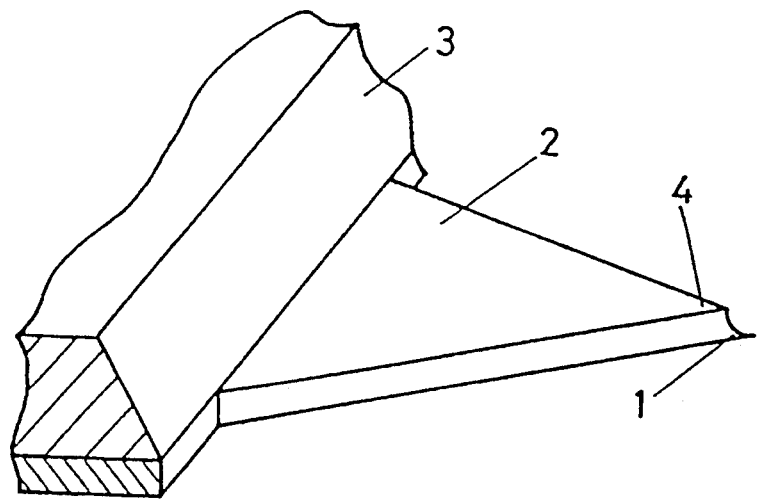
FIG. 2 is a perspective view of a cantilever stylus for use in an atomic force microscope according to a first embodiment of the present invention.

Referring now to the drawings, there is shown in FIG. 2 a flat cantilever 2 having a stylus 1 integrally formed therewith at the tip thereof according to a first embodiment of the present invention. This flat cantilever 2 is used in an atomic force microscope.

As shown in FIG. 2, the cantilever 2 has one end fixedly connected to a base material 3 and a free end 4. The cantilever 2 further has two flat principal surfaces. The tip of one principal surface protruding beyond the other is used as the stylus 1.

Figure 3:
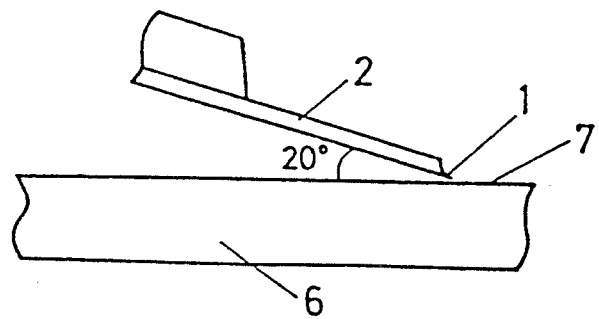
FIG. 3 is a side elevational view of the cantilever stylus of FIG. 2 and a sample to be observed.

FIG. 3 shows a relationship between the cantilever stylus 1 and a sample 6 during an observation. In FIG. 3, the cantilever 2 forms an angle of approximately 20° with the sample 6 to be observed. When the cantilever stylus 1 is located in close proximity to a sample surface 7, forces are generated between atoms of the sample surface 7 and those of the cantilever stylus 1, thereby slightly bending the cantilever 2. These forces include attractive van der Waals forces, magnetic forces, electrostatic forces, and repulsive forces. Detecting the bending of the cantilever 2 by any suitable method makes it possible to observe the sample surface 7.

Figure 4A:
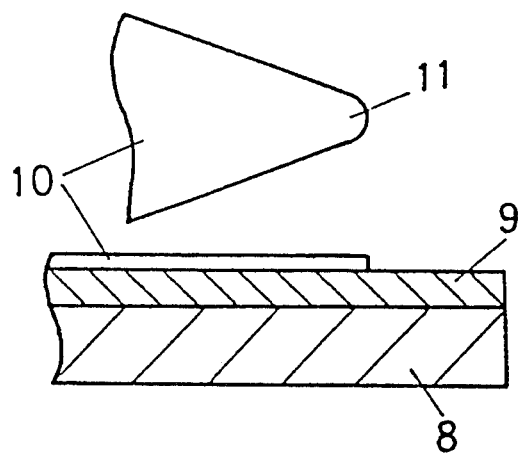
FIGS. 4a to 4c are process diagrams indicative of processes for making the cantilever stylus of FIG. 2.
Figure 4B:
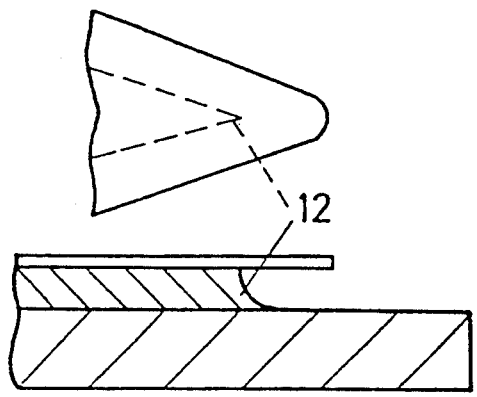
Figure 4C:
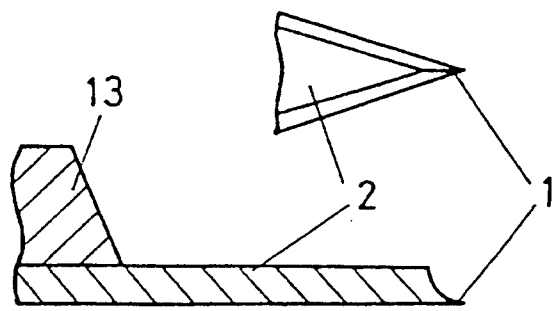

FIGS. 4a to 4c depict processes for making the cantilever stylus for use in the atomic force microscope. A $SiO_2$ film 9 having a thickness of 1 to 2 $\mu$m is initially formed on the surface of a Si substrate 8 as a material of the cantilever stylus 1 by thermal oxidation. A $WSi_2$ film 10 having a thickness of 0.1 $\mu$m is then formed on the surface of the $SiO_2$ film 9 as a resist film. The $WSi_2$ film 10 is processed into a configuration having a tip 11 by the known photoetching technique (FIG. 4a). The radius of curvature of the tip 11 of the $WSi_2$ film 10 formed is approximately 0.5 $\mu$m. Then, the substrate 8 is submerged in a buffer etching solution (mixed solution of one volume of HF and six volumes of $NH_4F$) to perform an isotropic etching of the $SiO_2$ film 9 for 20 minutes with the $WSi_2$ film 10 serving as the resist film (FIG. 4b). In this embodiment, a tip 12 having a radius of curvature of approximately 300 Å is formed. Then, the substrate is submerged in a dilute mixed solution of hydrofluoric acid and nitric acid to remove the $WSi_2$ film 10 by etching. Thereafter, the cantilever formed is caused to adhere to a base material 13 and the Si substrate 8 is removed by etching to complete the processes required for making the cantilever 2 and the stylus 1. The tip of the stylus 1 has a radius of curvature of 300 Å (FIG. 4c).

The material of the stylus and that of the resist film is not limited to the combination of $SiO_2$ and $WSi_2$, but $Si_3N_4$ or the like may be used as the material of the stylus and a conventional photoresist material may be used as the material of the resist film.

In this embodiment, although the tip of the protruding principal surface of the cantilever is used as the stylus, a considerably small radius of curvature and a high resolution can be obtained by using the tip of the other principal surface as the stylus. In this case, by the use of monocrystal Si as the Si substrate, the base material of the cantilever can be directly obtained from the Si substrate by anisotropic etching, thereby simplifying the processes.

Figure 5:
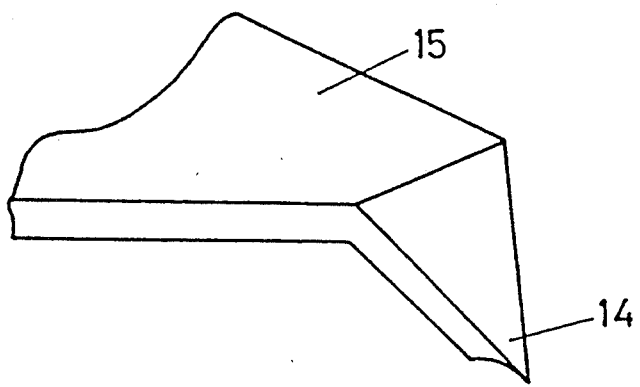
FIG. 5 is a perspective view of a cantilever stylus according to a second embodiment of the present invention.

FIG. 5 depicts a cantilever 15 and a stylus 14 integrally formed therewith according a second embodiment of the present invention. The stylus surface forms an angle of 55° with the cantilever 15.

Figure 6A:
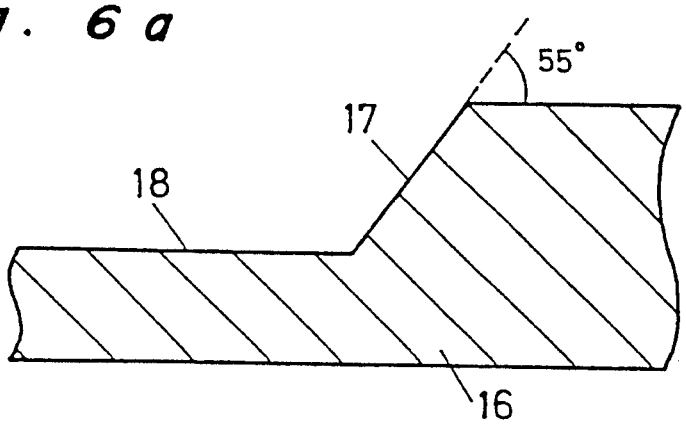
FIGS. 6a to 6c are process diagrams indicative of processes for making the cantilever stylus of FIG. 5.
Figure 6B:
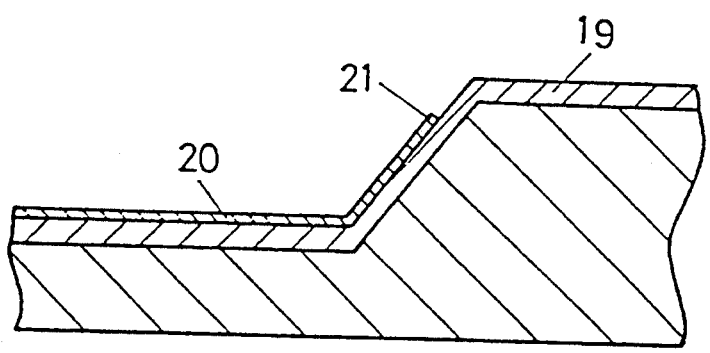
Figure 6C:
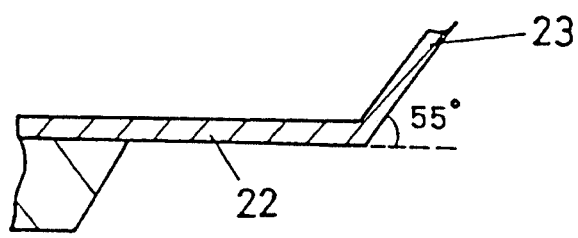

FIGS. 6a to 6c depict processes for making the cantilever stylus 14 of FIG. 5. An inclined <111> surface 17 of Si is initially formed on a monocrystal Si substrate 16 by anisotropic etching (FIG. 6a). The <111> surface 17 formed makes a angle of 55° with an <100> surface 18. At this time, the angle of the inclined surface 17 may be controlled by another method. For example, a steep inclination can be obtained by spatter etching, and the inclination can be easily changed through wet-type processes, because the amount of side etching changes according to the etching speed. After a $SiO_2$ film 19 having a thickness of 1 to 2 $\mu$m is formed on the surface of the 10 substrate 16 by thermal oxidation as the material of the cantilever stylus, a $WSi_2$ film 20 having a thickness of 0.1 $\mu$m is formed on the surface of the $SiO_2$ film 19. The $WSi_2$ film 20 is processed so that at least a tip 21 is located on the inclined surface by the normal photoetching (FIG. 6b). Thus, a stylus 23 having a radius of curvature of 300 Å and making an angle of 55° with a cantilever 22 is formed by the processes as employed in the first embodiment (FIG. 6c). When the inclination of the stylus makes an angle of 45° to 90° with the cantilever, the tip of one principal surface protruding beyond the other principal surface can be used as the stylus. On the other hand, when the inclination of the stylus makes an angle of 0° to 45° with the cantilever, the latter tip of the principal surface can be used as the stylus.

AS the material of the stylus and that of the resist film, the combination of the materials as previously described can be used.

Figure 7:
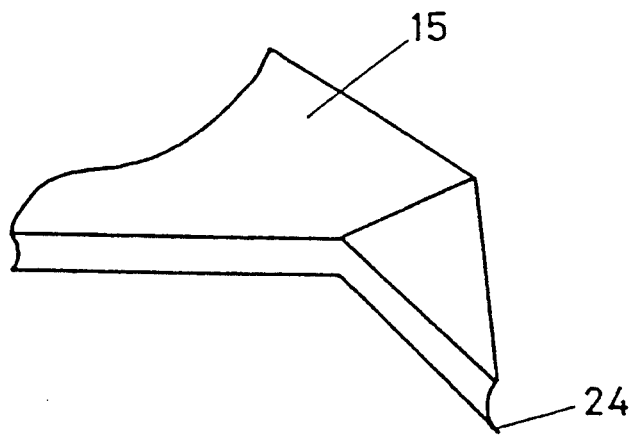
FIG. 7 is a view similar to FIG. 5, showing a modification thereof.

In this embodiment, although the cantilever is made by utilizing the lower <100> surface of the Si substrate, the cantilever may be made by utilizing the upper <100> surface of the Si substrate. In this case, as shown in FIG. 7, the tip 24 of one principal surface protruding beyond the other principal surface can be used as the stylus at an inclination in the range of 0° to 90°.

According to the present invention, without using a fine processing technique on the order of sub-microns, such as the FIB, a stylus having a radius of curvature of the tip less than 0.1 $\mu$m and superior adhesive properties to the cantilever can be formed by conventional photoetching technique. As a result, an atomic force microscope high in reliability and in resolution and capable of observing a sample surface on the order of atoms can be obtained using the stylus according to the present invention.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A method of making a cantilever stylus, comprising:

forming a film on a surface of a substrate, the film comprising a stylus material different from the material of the substrate;

forming a resist thin film of a material different from the stylus material on a surface of the stylus material so that the resist thin film has a tip;

etching the stylus material with an isotropic etching technique to a depth of etching greater than the radius of curvature of the tip of the resist thin film such that the stylus material, having two principal surfaces, has a tip formed on one of the principal surfaces with a radius of curvature less than 0.1 $\mu$m which protrudes beyond a tip of the other principal surface; and removing at least the resist thin film and the substrate at the tips of the principal surfaces of the stylus material.

2. The method of claim 1, wherein in the step of etching, stylus material between the substrate and the resist thin film is removed so that a space is formed adjacent to the remaining stylus material between the substrate and the resist thin film.

3. The method of claim 2, and further comprising the step of forming an inclined surface on one portion of the substrate inclined relative to another portion of the substrate, and wherein the tips of the principal surfaces of the stylus material are formed on the inclined surface of the substrate.

4. The method of claim 1, and further comprising the step of forming an inclined surface on one portion of the substrate inclined relative to another portion of the substrate, and wherein the tips of the principal surfaces of the stylus material are formed on the inclined surface of the substrate.

* * * * *

UNITED STATES PATENT AND TRADEMARK OFFICE
CERTIFICATE OF CORRECTION

PATENT NO. : 5,336,369
DATED : Aug. 9, 1994
INVENTOR(S) : Kado et al.

It is certified that error appears in the above-identified patent and that said Letters Patent is hereby corrected as shown below:

On the title page, item [75], change "Katano" to --Osaka--.

Signed and Sealed this

Fifteenth Day of November, 1994

Attest:

BRUCE LEHMAN

Attesting Officer  Commissioner of Patents and Trademarks